United States Patent
Bang et al.

(10) Patent No.: US 7,548,798 B2
(45) Date of Patent: Jun. 16, 2009

(54) PASTE DISPENSER AND METHOD FOR CONTROLLING THE SAME

(75) Inventors: Kyu Yong Bang, Gumi-si (KR); Yong Kyu Seo, Gimcheon-si (KR)

(73) Assignee: Top Engineering, Co., Ltd., Kumi (KR)

( * ) Notice: Subject to any disclaimer, the term of this patent is extended or adjusted under 35 U.S.C. 154(b) by 347 days.

(21) Appl. No.: 10/869,326

(22) Filed: Jun. 16, 2004

(65) Prior Publication Data

US 2005/0010329 A1 Jan. 13, 2005

(30) Foreign Application Priority Data

Jun. 20, 2003 (KR) .................. 10-2003-0040341

(51) Int. Cl.
*G05B 19/18* (2006.01)
(52) U.S. Cl. .................. 700/253; 700/96; 700/259; 222/41; 222/52; 356/399; 356/614
(58) Field of Classification Search .............. 700/213, 700/240, 231, 96, 253, 259; 222/52, 41; 29/739, 740; 118/241, 242, 256; 438/7, 438/14, 16; 324/758; 356/399, 614
See application file for complete search history.

(56) References Cited

U.S. PATENT DOCUMENTS

| | | | | |
|---|---|---|---|---|
| 4,661,368 A * | 4/1987 | Rohde et al. | .................. | 427/8 |
| 4,725,884 A * | 2/1988 | Gurnell et al. | .................. | 348/79 |
| 4,760,269 A * | 7/1988 | McKenna | .............. | 250/559.38 |
| 4,762,578 A * | 8/1988 | Burgin et al. | .................. | 156/64 |
| 4,868,007 A * | 9/1989 | Taguchi | .................. | 427/98.4 |
| 4,935,261 A * | 6/1990 | Srivastava et al. | .............. | 427/10 |
| 4,938,383 A * | 7/1990 | Yamazaki et al. | .............. | 222/41 |
| 4,972,798 A * | 11/1990 | Ando et al. | .................. | 118/669 |
| 5,110,615 A * | 5/1992 | Maiorca et al. | .................. | 427/8 |
| 5,134,665 A * | 7/1992 | Jyoko | .................. | 382/150 |
| 5,370,905 A * | 12/1994 | Varga et al. | .................. | 427/168 |
| 5,415,693 A * | 5/1995 | Yoneda et al. | .............. | 118/664 |
| 5,437,727 A * | 8/1995 | Yoneda et al. | .............. | 118/669 |
| 5,505,777 A * | 4/1996 | Ciardella et al. | ............. | 118/663 |
| 5,539,676 A * | 7/1996 | Yamaguchi | .................. | 700/279 |
| 5,558,504 A * | 9/1996 | Stridsberg | .................... | 417/322 |
| 5,614,024 A * | 3/1997 | Ishida et al. | .................. | 118/712 |
| 5,804,983 A * | 9/1998 | Nakajima et al. | ............ | 324/758 |
| 5,932,012 A * | 8/1999 | Ishida et al. | .................. | 118/669 |
| 6,394,161 B1 * | 5/2002 | Kakishima et al. | .......... | 156/356 |

(Continued)

FOREIGN PATENT DOCUMENTS

JP 04-244258 9/1992

(Continued)

*Primary Examiner*—Gene Crawford
*Assistant Examiner*—Timothy R Waggoner
(74) *Attorney, Agent, or Firm*—Ked & Associates, LLP

(57) ABSTRACT

A paste dispenser and a method for controlling the same are disclosed. The paste dispenser includes a stage having a substrate mounted thereon, at least one nozzle dispensing a paste on the substrate by relative movement between the nozzle and the substrate, a measuring means provided at a position facing into an outlet of the nozzle and directly measuring a position of an exchange nozzle, and a controller converting a compensation value in accordance with a displacement of the exchange nozzle based on data measured by the measuring means.

14 Claims, 4 Drawing Sheets

U.S. PATENT DOCUMENTS

| | | | |
|---|---|---|---|
| 6,689,219 B2 * | 2/2004 | Birmingham | 118/669 |
| 6,711,466 B2 * | 3/2004 | Abraham et al. | 700/240 |
| 6,749,688 B2 * | 6/2004 | Tateyama et al. | 118/667 |
| 7,160,512 B2 * | 1/2007 | Hirota et al. | 422/100 |
| 2005/0269375 A1 * | 12/2005 | Ahn et al. | 222/504 |
| 2006/0016540 A1 * | 1/2006 | Yoshino | 156/64 |

FOREIGN PATENT DOCUMENTS

| | | |
|---|---|---|
| JP | 05-329423 | 12/1993 |
| JP | 9001026 | 1/1997 |
| JP | 9094500 | 4/1997 |
| JP | 11-033458 | 2/1999 |
| JP | 2003-001175 | 1/2003 |
| JP | 2003-178677 | 6/2003 |
| JP | 2003-251257 | 9/2003 |

* cited by examiner

PASTE DISPENSER AND METHOD FOR CONTROLLING THE SAME

CROSS-REFERENCE TO RELATED APPLICATIONS

This application claims the benefit of Korean Patent Application No. 10-2003-040341, filed on Jun. 20, 2003, which is hereby incorporated by reference as if fully set forth herein.

BACKGROUND OF THE INVENTION

1. Field of the Invention

The present invention relates to a paste dispenser and a method for controlling the same, and more particularly, to a paste dispenser and a method for controlling the same having a nozzle position compensating device, in order to accurately compensate or correct the position of a newly exchanged nozzle, when the nozzle is exchanged in the paste dispenser.

2. Discussion of the Related Art

Generally, a paste dispenser is a device used to dispense various types of paste, such as a resistive paste and a sealing paste, on a substrate in a set form, in other words, a desired pattern.

The paste dispenser consists of a stage on which a substrate is mounted, and a head unit having a nozzle for dispensing the paste on the substrate. Herein, the head unit includes a paste container accommodating the paste therein, and a nozzle connected to the paste container and dispensing the paste on the substrate. When dispensing a paste pattern on a substrate, the relative position between the substrate and the nozzle is changed, and thus a desired paste pattern is formed on the substrate.

Meanwhile, when the paste within the paste container is exhausted, the used paste container and nozzle are newly replaced (hereinafter collectively referred to as "nozzle exchange"). Also, when the paste pattern is completely formed on a first substrate, generally, the paste container and the nozzle are newly replaced, so as to form paste patterns on a second substrate.

When exchanging the nozzle, due to the fabrication accuracy of the nozzle or the paste container, the assembly accuracy between the nozzle and the paste container, and so on, the relative position of the nozzle (more specifically, an outlet of the nozzle) to the substrate is altered before and after the nozzle exchange. Since the paste pattern on a substrate must be accurately formed, the position of the exchange nozzle should be compensated or corrected.

The method of compensating the position of the exchanged nozzle is disclosed in the Korean Patent Application No. 10-1997-0003540. According to the above-referenced application, in order to compensate the nozzle position, a dummy substrate for correcting a nozzle is mounted on a stage. Then, the paste is dispensed on the substrate in the form of a plurality of dots or in linear forms crossing over one another. The position of the dispensed paste pattern is measured by an image sensing camera, so as to compensate the position of the exchange nozzle. When the compensation is completed, a real substrate (i.e., an actually used substrate) is used to form a desired paste pattern.

However, the above-described related art paste dispenser has the following disadvantages.

The actually dispensed paste on the dummy substrate is measured, so as to compensate the position of the exchanged nozzle. In other words, in the related art, the dummy substrate should be detachably fixed to the stage, and the paste should be dispensed on the dummy substrate. Therefore, surplus time is consumed for this compensating process, which has no relation with the actual process of dispensing the paste to the real substrate.

Also, in the related art, since the paste should be actually dispensed on the dummy substrate, the fabrication cost is increased.

Finally, the position of the nozzle is not directly compensated. In other words, since the dispensed paste is used instead of an exchanged nozzle, the position of the nozzle is indirectly compensated, and thus the accuracy in compensating the nozzle position is reduced.

SUMMARY OF THE INVENTION

Accordingly, the present invention is directed to a paste dispenser and a method for controlling the same that substantially obviate one or more problems due to limitations and disadvantages of the related art.

An object of the present invention is to provide a paste dispenser and a method for controlling the same that can compensate a nozzle position without using a dummy substrate.

Another object of the present invention is to provide a paste dispenser and a method for controlling the same that can reduce the time consumed in the compensating process and also reduce the compensating cost.

A further object of the present invention is to provide a paste dispenser and a method for controlling the same that can enhance the accuracy in compensating the nozzle position.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a paste dispenser includes a stage having a substrate mounted thereon, at least one nozzle dispensing a paste on the substrate by relative movement between the nozzle and the substrate, a measuring means provided at a position facing into an outlet of the nozzle and directly measuring a position of an exchange nozzle, and a controller converting a compensation value in accordance with a displacement of the exchange nozzle based on data measured by the measuring means. Also, the paste dispenser further includes a moving means moving the exchange nozzle to the measuring means. Herein, it is preferable that the measuring means is an image sensing device.

Meanwhile, it is preferable that the controller compensates a position of the measuring means based on a reference nozzle selected from the nozzles. And, the reference nozzle should be stably fixed.

Preferably, the measuring means is provided on a position of the stage, and the stage is moved to the reference nozzle when compensating the position of the measuring means. And, herein, the stage should be moved to the exchange nozzle when compensating the position of the exchange nozzle.

The reference nozzle is moved to the stage when compensating the position of the measuring means. And, the exchange nozzle may be moved to the stage when compensating the position of the exchange nozzle.

In another aspect of the present invention, a method for controlling a paste dispenser includes the steps of compensating a measuring means position, and compensating an exchange nozzle position by using the measuring means without dispensing a paste.

Preferably, the measuring means position compensating step includes relatively moving the measuring means to a reference nozzle position, and converting a compensation position of the measuring means by using data measured from the measuring means.

Further, it is preferable that the exchange nozzle position compensating step includes relatively moving the measuring means to the exchange nozzle position, and converting a compensation position of the exchange nozzle by using data measured from the measuring means. Herein, the exchange nozzle compensating step further includes moving the exchange nozzle to a compensation position.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
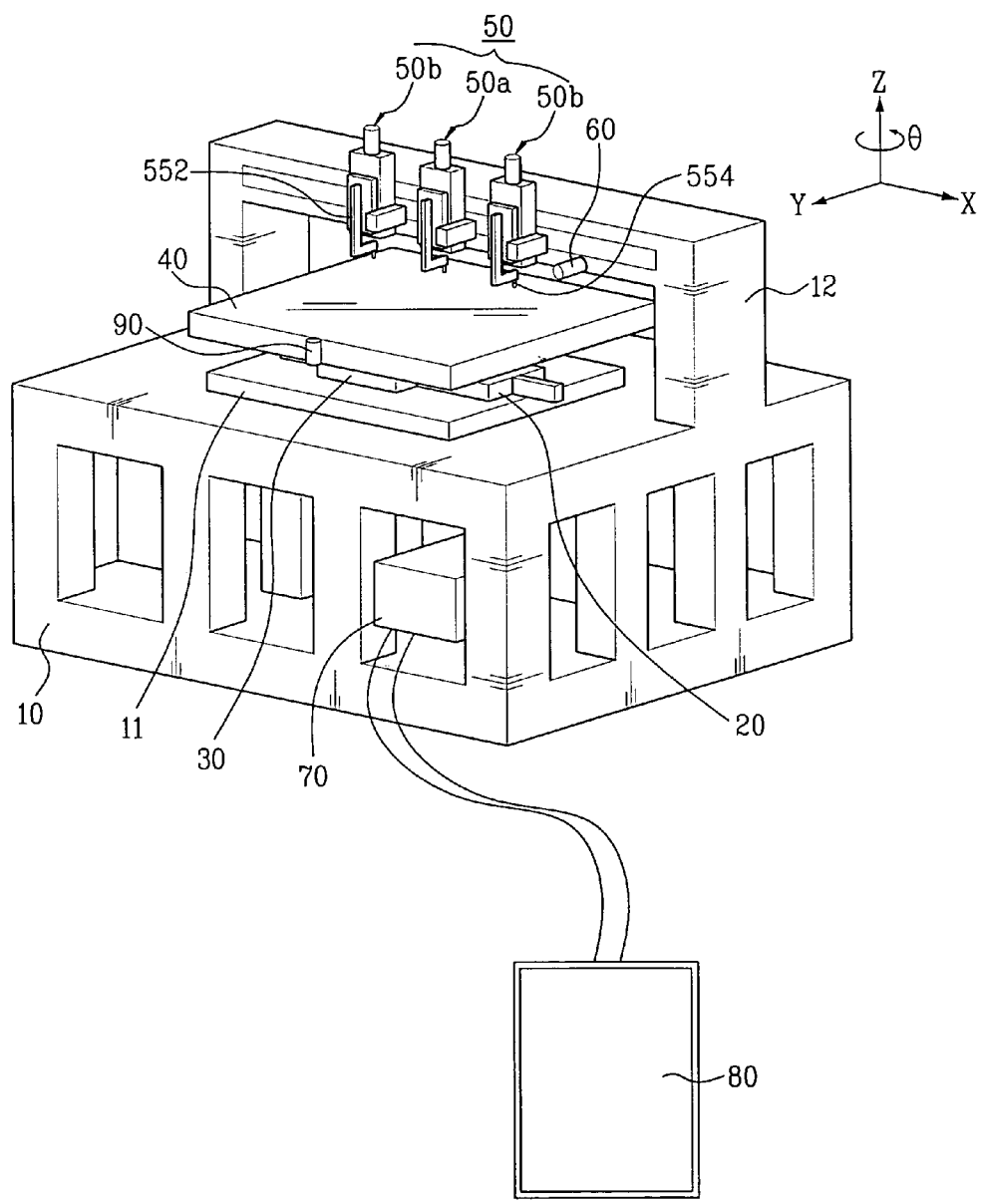
FIG. 1 illustrates a perspective view showing the structure of a paste dispenser according to the present invention.

FIG. 1 illustrates a perspective view showing a preferred embodiment of the paste dispenser according to the present invention. Referring to FIG. 1, the structure of the paste dispenser according to the present invention will now be described in detail.

An X-axis table 20 is movably mounted above a frame 10 in an X-axis direction. A Y-axis table 30 is movably mounted on the X-axis table 10 in a Y-axis direction. Then, a θ-axis table (not shown) is rotatably mounted on the Y-axis table 30, so as to rotate along a θ-axis. A stage 40, in which a substrate is installed, is provided on the θ-axis table. Subsequently, a column 12 is provided at a central portion of the θ-axis table, and a plurality of head units 50 is provided on the column 12. Herein, each of the head units 50 is movable along a Z-axis and includes a nozzle. In addition, an alignment camera 60 correcting the position of the substrate on the stage 40 is also provided on the column 12.

Meanwhile, each head unit 50 includes a paste container 552 filled with paste and a nozzle 554. Also, the head unit 50 includes X, Y, and Z-axis nozzle motors (not shown) allowing the nozzles to move along the X-axis, the Y-axis, and the Z-axis. The head unit 50 may also include a separate Z-axis fine adjustment motor for finely adjusting the height of the head unit 50, so that the nozzle and the substrate are accurately spaced apart from each other, after the substrate is mounted on the stage.

Meanwhile, a measuring means 90 is provided at a portion of the stage 40, so as to compensate the position of the exchanged nozzle. Preferably, the measuring means 90 is an image sensing device, such as a camera. As shown in FIG. 1, the measuring means 90 is provided at one side of the stage 40. However, the position of the measuring means 90 is not limited to the example shown in FIG. 1. In other words, the measuring means 90 could be provided to face into the nozzle (or the nozzle outlet) 554, whereby the nozzle position can be directly measured. For example, an incision can be made in a portion of the stage 40, and the measuring means 90 can be mounted therein.

As described above, it is preferable that a plurality of head units 50 is provided on the column 12. When forming a plurality of paste patterns on a substrate, the fabrication process can be reduced and simplified by forming the plurality of paste patterns with a plurality of head units 50. Preferably, when a plurality of head units 50 is provided on a column 12, it is preferable that at least one head unit 50a is stably fixed to the column 12, and each of the remaining head units 50b is movably fixed to the column along the X-axis direction (i.e., the direction of the column).

Figure 2:
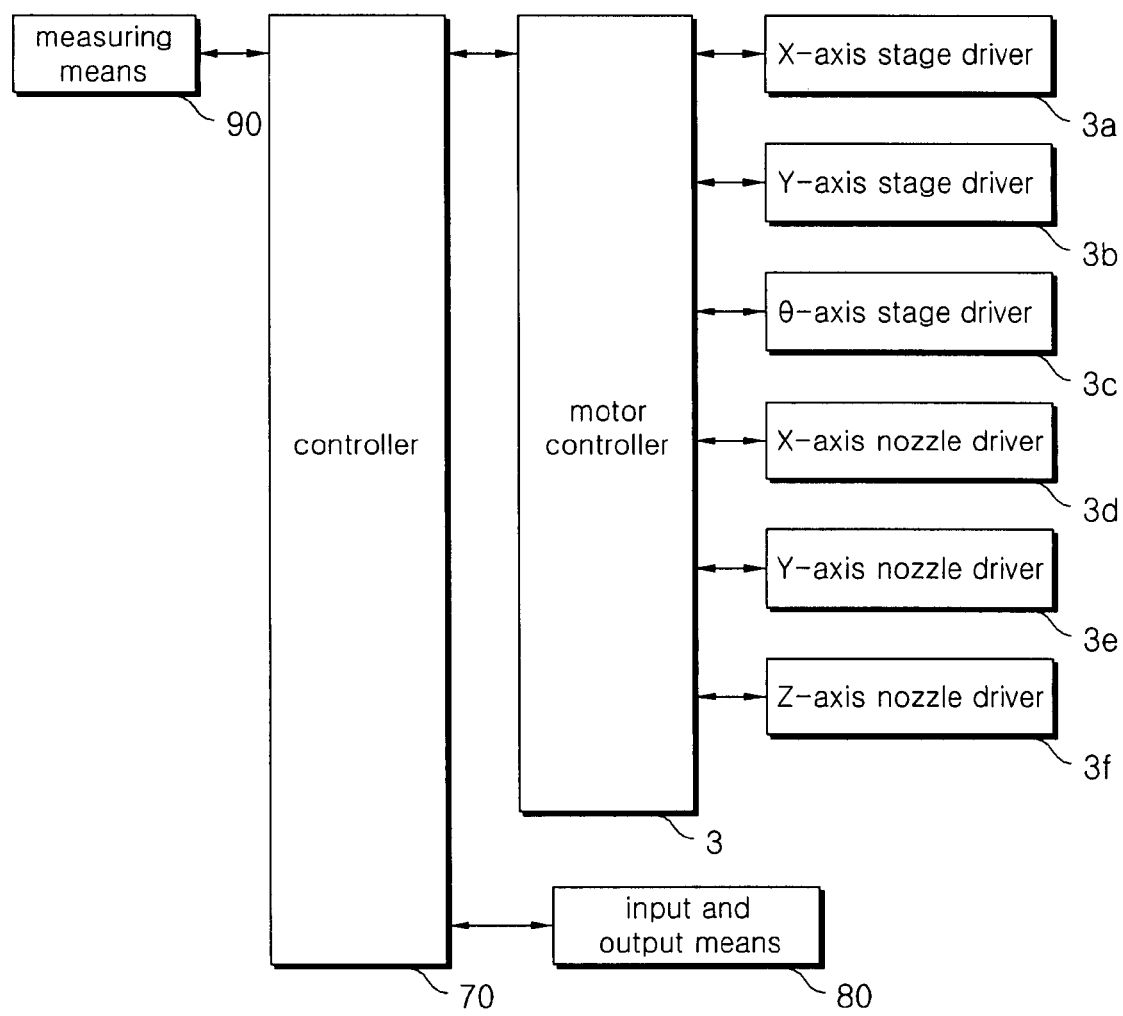
FIG. 2 illustrates a block diagram showing a controlling structure of the paste dispenser according to the present invention.

FIG. 2 illustrates a block diagram showing a controlling structure of the paste dispenser according to the present invention.

Referring to FIG. 2, a controller 70 acting as a central processing unit is connected to each of the measuring means 90, a motor controller 3, and an input and output means 80. An X-axis stage driver 3a, a Y-axis stage driver 3b, and a θ-axis stage driver 3c are connected to the motor controller 3. And, an X-axis nozzle driver 3d, a Y-axis nozzle driver 3e, and a Z-axis nozzle driver 3f are also connected to the motor controller 3.

Each of the X-axis, Y-axis, and θ-axis stage drivers 3a, 3b, and 3c respectively controls the operation of the X-axis, Y-axis, and θ-axis tables. And, each of the X-axis, Y-axis, and Z-axis nozzle drivers 3d, 3e, and 3f finely controls the position of the nozzle 554 to the X-axis, Y-axis, and Z-axis directions, respectively.

As described above, the paste pattern having a specific form is formed based on the relative movement between the substrate and the nozzle. As shown in FIG. 1, the nozzle is fixed 554, whereas the substrate, more specifically, the stage 40 moves along the X-axis and the Y-axis, so as to form the paste pattern having a specific form. The nozzle 554 can also move along the Z-axis direction, and the distance between the substrate and the nozzle outlet determines the width and thickness of the dispensed paste pattern.

Figure 3:
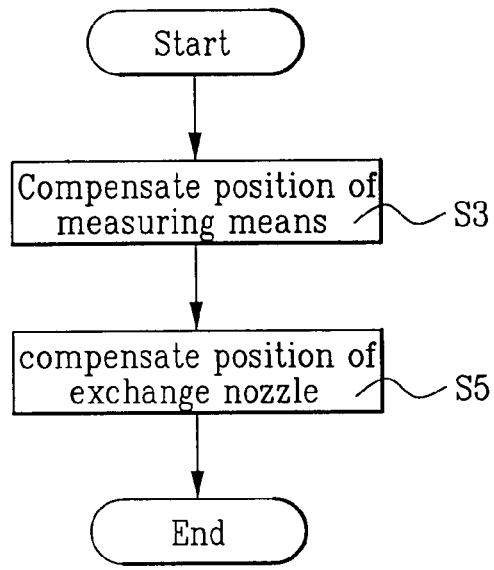
FIG. 3 illustrates a flow chart showing the process steps of controlling the paste dispenser according to the present invention.

A detailed description of a general method of driving the paste dispenser will be well known to a skilled person in the art and, therefore, will be omitted for simplicity. FIG. 3 illustrates a flow chart showing the process steps of controlling the paste dispenser according to the present invention.

Referring to FIG. 3, when the paste contained in the paste container is exhausted, a new set of paste container and nozzle is attached to the corresponding head unit 50. At this point, as described in the related art paste dispenser, the position of the nozzle may be altered, and so the position of the newly exchanged nozzle (hereinafter referred to as an "exchange nozzle") is compensated. The position of the exchange nozzle is compensated in the X-axis and Y-axis directions. More specifically, when the paste is actually dispensed on the substrate, the Z-axis nozzle motor controls the distance between the substrate and the nozzle on a real-time basis. Therefore, when compensating the position of the exchange nozzle, the compensation of the error in the Z-axis direction is not required.

Meanwhile, it is preferable that the position of the measuring means is compensated before substantially compensating the position of the exchange nozzle, because the position of the measuring means can also be altered if the operation of the paste dispenser is continued. The method for controlling the paste dispenser according to the present invention includes compensating a position of the measuring means (S3), and compensating a position of the exchange nozzle (S5). Evidently, the position of the exchange nozzle can be directly compensated without performing the step of compensating the position of the measuring means.

Figure 4:
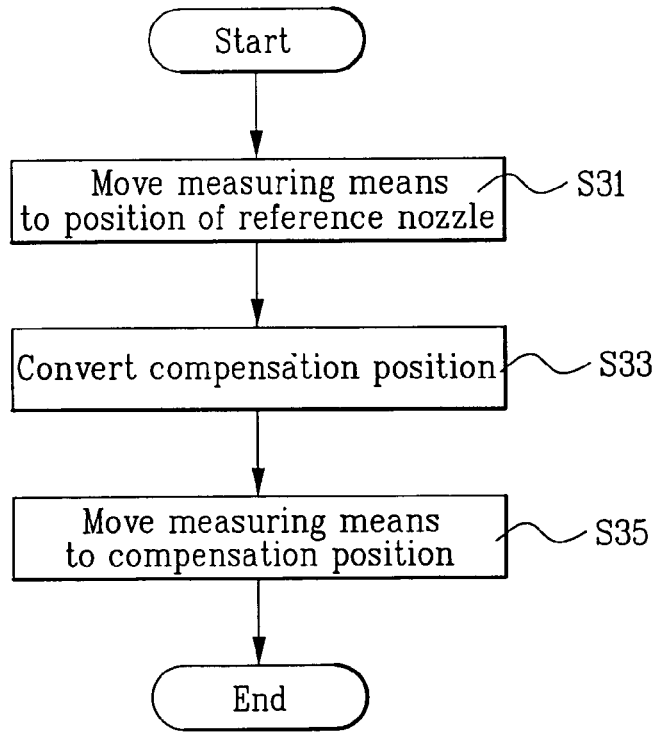
FIG. 4 illustrates a flow chart showing a method for compensating the position of a measuring means of FIG. 3.

FIG. 4 illustrates a flow chart showing a method for compensating the position of a measuring means of FIG. 3.

Referring to FIG. 4, when the operation of the paste dispenser is continued, the position of the measuring means can also be altered. Therefore, it is preferable that the position of the measuring means is compensated, prior to the compensation of the exchange nozzle position. Preferably, one of the nozzles provided on the column is selected as a reference nozzle, which is used to compensate the position of the exchange nozzle. The reference nozzle can be selected through a wide range of methods, however, it is preferable that the nozzle used during the alignment of the substrate (i.e., the nozzle based on which the paste pattern is formed) is selected as the reference nozzle. More specifically, generally, when the substrate is brought to the stage and installed thereon, an alignment camera is used to align the substrate and the nozzle to their corresponding positions. In other words, the substrate is aligned so that the center point of the substrate and a nozzle (i.e., the reference nozzle) are spaced apart from each other at a set distance. Therefore, it is preferable that the nozzle used in the step of aligning the substrate should be selected as the reference nozzle. In addition, it is more preferable that the reference nozzle should be stably fixed to the column, so as to prevent the nozzle from moving along the X-axis direction.

The step of compensating the position of the measuring means will now be described in detail.

When a nozzle is exchanged, the exchange nozzle can be moved to a set position determined as a relative position of the reference nozzle, for example, a starting position of the paste pattern dispensing. Also, the position relation between the reference nozzle and the exchange nozzle is predetermined based on a paste dispensing condition, and the controller is informed of the position relation in advance. Furthermore, the controller is also pre-informed of the position relation between the nozzle and the measuring means.

The measuring means moves to the position of the reference nozzle (S31). Actually, the stage, in which the measuring means is provided, moves to the position of the reference nozzle. As explained above, the controller is informed of the position relation between the reference nozzle and the measuring means, and thus the measuring means is moved to the reference nozzle by using such position relation. If the position of the measuring means is not changed, the center of the measuring means is exactly located at the center of the reference nozzle. That is, the center of the measuring means is consistent with the center of the reference nozzle.

More specifically, when the movement of the measuring means to a specific position is completed, the measuring means measures the position of the reference nozzle. For example, an image of the reference nozzle is captured, and then, the controller performs an image processing of the captured image, thereby determining the position of the nozzle outlet. If the position of the reference nozzle outlet is not located at the center of the captured image, it is considered that displacement of the measuring means takes place. Subsequently, the measuring means is adequately moved so that the reference nozzle outlet is placed at the center of the image. At this point, the distances moved in both of the X-axis and Y-axis directions are used to convert the displacement distance. Herein, since a motor and an encoder are connected to each of the X-axis and Y-axis stage drivers 3*a* and 3*b* driving the stage, the displacement distance can be calculated. Then, the measured displacement distance is used to convert the compensated position of the measuring means (S33). Thereafter, the measuring means is moved to the compensated position (S35). Herein, instead of being moved to the compensated position, it is also possible to compensate the position of the measuring means stored in the controller. When the above-described process is performed, the position of the measuring means stored by the controller and the actual position of the measuring means become identical.

Figure 5:
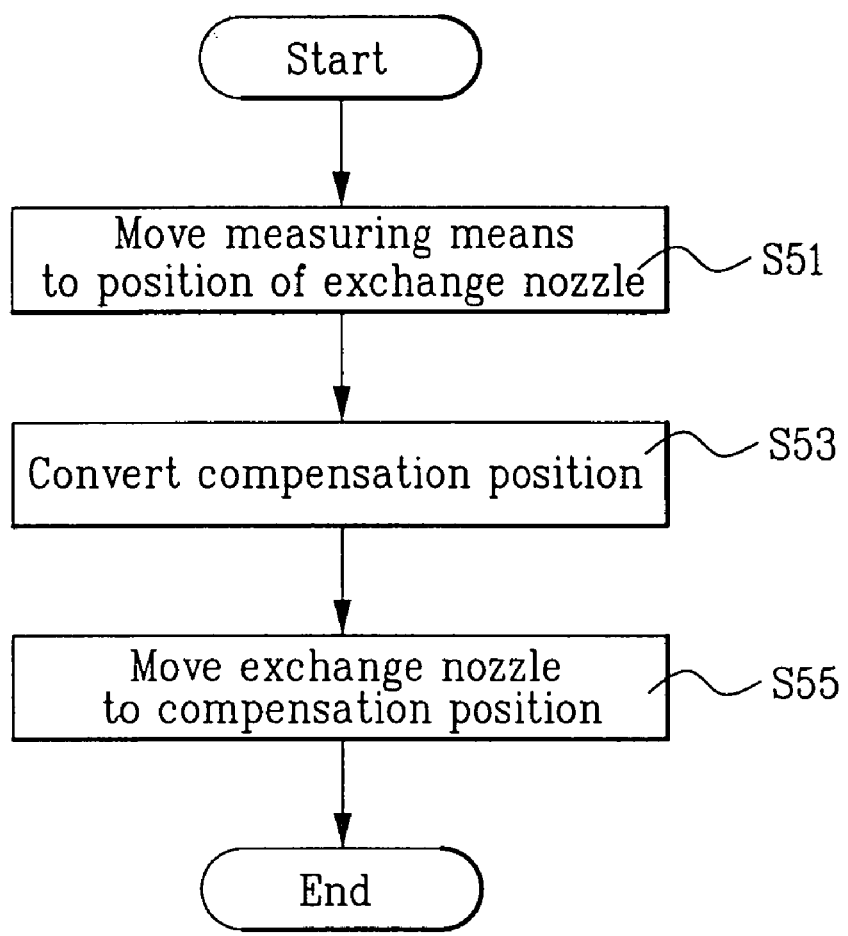
FIG. 5 illustrates a flow chart showing a method for compensating the position of an exchange nozzle of FIG. 3.

FIG. 5 illustrates a flow chart showing a method for compensating the position of an exchange nozzle of FIG. 3.

Referring to FIG. 5, the measuring means is moved to the specific predetermined position of the exchange nozzle so as to measure the exchange nozzle outlet, thereby determining whether the exchange nozzle is accurately placed at the specific position and converting the compensated position (S51 and S53). At this point, the position relation between the exchange nozzle and the measuring means is predetermined and stored in the controller. Also, the method for converting the compensated position is identical to the above-described method of compensating the position of the measuring means, and therefore, a detailed description will be omitted for simplicity.

When the compensated position of the exchange nozzle is converted, the X-axis and Y-axis nozzle drivers are used to move the nozzle to the compensated position (S55). Then, preferably, when the movement of the exchange nozzle to the compensated position is completed, the position of the exchange nozzle is measured once again, thereby verifying whether the compensated position is within the error range. If the compensated position of the exchange nozzle is within the error range, then the compensation of the exchange nozzle position is completed. When the position compensation of the exchange nozzle is complete, the real substrate (i.e., the actually used substrate) is mounted on the stage, and the paste is dispensed on the substrate in accordance with the dispensing order, thereby forming a desired paste pattern.

Meanwhile, in the above embodiment, a stage with a substrate moves along the X-axis and Y-axis directions, and a nozzle does not move along the X-axis and Y-axis directions (hereinafter referred to as a "moving stage type paste dispenser"). However, the present invention is not limited to the example illustrated herein. In other words, the principles of the present invention can also be applied to a paste dispenser, in which, instead of a stage, a nozzle moves along the X-axis and Y-axis directions (hereinafter referred to as a "fixed stage type paste dispenser"), so as to form a paste pattern having a set form.

However, in the fixed stage type paste dispenser, the column is generally moved along the Y-axis direction, and all of the head units are moved along the X-axis direction. Therefore, unlike in the above-described preferred embodiment, when compensating the position of the measuring means, the reference nozzle is moved to the measuring means so as to compensate the position of the measuring means from the reference nozzle. At this point, it is preferable that the nozzle used during the alignment of the substrate is selected as the reference nozzle.

When the compensation of the position of the measuring means is completed, the position of the exchange nozzle is then compensated. Similarly, in the fixed stage type paste dispenser, the measuring means is moved to the exchange nozzle so as to detect the position of the exchange nozzle, thereby compensating the position of the exchange nozzle.

The paste dispenser according to the present invention has the following advantages.

In the present invention, when compensating the position of an exchange nozzle, the process of loading and unloading a dummy substrate and dispensing a paste thereon is not required, thereby reducing the time consumed during the compensating process. As a result, the total time of the dispensing process can be reduced. In recent technologies, shorter dispensing time largely contributes to the improvement of the entire fabrication process. Also, the dummy substrate and the additional paste dispensed thereon are removed from the compensating process, thereby reducing the cost.

Moreover, the position of an exchange nozzle outlet is directly detected and verified by a measuring means and the paste is not required in this process, thereby allowing the position to be accurately compensated.

It will be apparent to those skilled in the art that various modifications and variations can be made in the present invention without departing from the spirit: or scope of the inventions. Thus, it is intended that the present invention covers the modifications and variations of this invention provided they come within the scope of the appended claims and their equivalents.

What is claimed is:

1. A paste dispenser for dispensing a paste onto a substrate, comprising:
    a stage for receiving a substrate;
    a nozzle unit mounted over the stage, wherein the nozzle unit comprises first and second nozzle units, and wherein both the first and second nozzle units are configured to dispense paste onto a substrate on the stage as one of the nozzle unit and the stage are moved relative to the other, and wherein at least one of the first and second nozzle units is movable relative to the other;
    a controller that is configured to control movements of at least one of the first and second nozzle units; and
    a measuring unit that is fixed relative to the stage, wherein the measuring unit is configured to determine positions of the first and second nozzle units, and wherein the controller is configured to cause one of the first and second nozzle units to move relative to the other based on the determined positions of the first and second nozzle units.

2. The paste dispenser of claim 1, wherein the measuring unit comprises an imaging unit configured to capture an image of the nozzle unit.

3. The paste dispenser of claim 2, wherein the controller is configured to receive an image of the nozzle unit from the measuring unit, and wherein the controller is configured to determine a position of the nozzle, relative to the stage, based on the received image of the nozzle unit.

4. The paste dispenser of claim 3, wherein the controller controls movements of one of the stage and the nozzle unit based on the determined position of the nozzle unit relative to the stage.

5. The paste dispenser of claim 3, wherein the nozzle unit remains stationary while the stage moves so that paste can be dispensed from the nozzle unit onto a substrate on the stage, and wherein the controller controls movements of the stage based on the determined position of the nozzle unit relative to the stage.

6. The paste dispenser of claim 1, wherein the controller receives a signal from the measuring unit that is indicative of a sensed position of the nozzle unit.

7. The paste dispenser of claim 6, wherein the nozzle unit is movable, wherein the controller controls movements of the nozzle unit, and wherein the controller adjusts a position of the nozzle based on the signal received from the measuring unit.

8. A paste dispenser for dispensing paste onto a substrate, comprising:
    a stage for receiving a substrate;
    a reference nozzle unit mounted over the stage, wherein the reference nozzle unit is configured to dispense paste onto a substrate on the stage as one of the reference nozzle unit and the stage are moved relative to the other;
    a second nozzle unit mounted over the stage, wherein the second nozzle unit is configured to dispense paste onto a substrate on the stage as one of the second nozzle unit and the stage are moved relative to the other, wherein the second nozzle unit is movable relative to the reference nozzle unit; and
    a measuring unit configured to sense positions of the reference nozzle unit and the second nozzle unit; and
    a controller that receives a signal from the measuring unit that is indicative of the positions of the reference and second nozzle units relative to the stage, wherein the controller causes the second nozzle unit to move relative to the reference nozzle unit based on the sensed positions of the reference and second nozzle units.

9. The paste dispenser of claim 8, wherein the measuring unit is configured to capture images of the reference nozzle unit and the second nozzle unit.

10. The paste dispenser of claim 8, wherein the measuring unit is fixed relative to the stage.

11. The paste dispenser of claim 10, wherein the stage is movable relative to the reference and second nozzle units, and wherein the measuring unit can be moved into positions directly opposite the reference and second nozzles to thereby sense positions of the reference and second nozzle units.

12. The paste dispenser of claim 8, wherein the reference nozzle unit is movable, and wherein a position of the reference nozzle unit relative to the stage is adjusted based on a sensed position of the reference nozzle unit.

13. The paste dispenser of claim 12, wherein the stage is movable relative to the reference and second nozzle units, and wherein the position of the stage is adjusted relative to the reference nozzle unit based on the sensed position of the reference nozzle unit.

14. The paste dispenser of claim 13, wherein a position of the second nozzle unit is adjusted relative to the reference nozzle unit based on a sensed position of the second nozzle unit relative to the stage.

* * * * *